Dec. 27, 1949 W. L. WILLCOX 2,492,408
SWITCH FOR SERVICE INDICATOR
Filed May 2, 1947
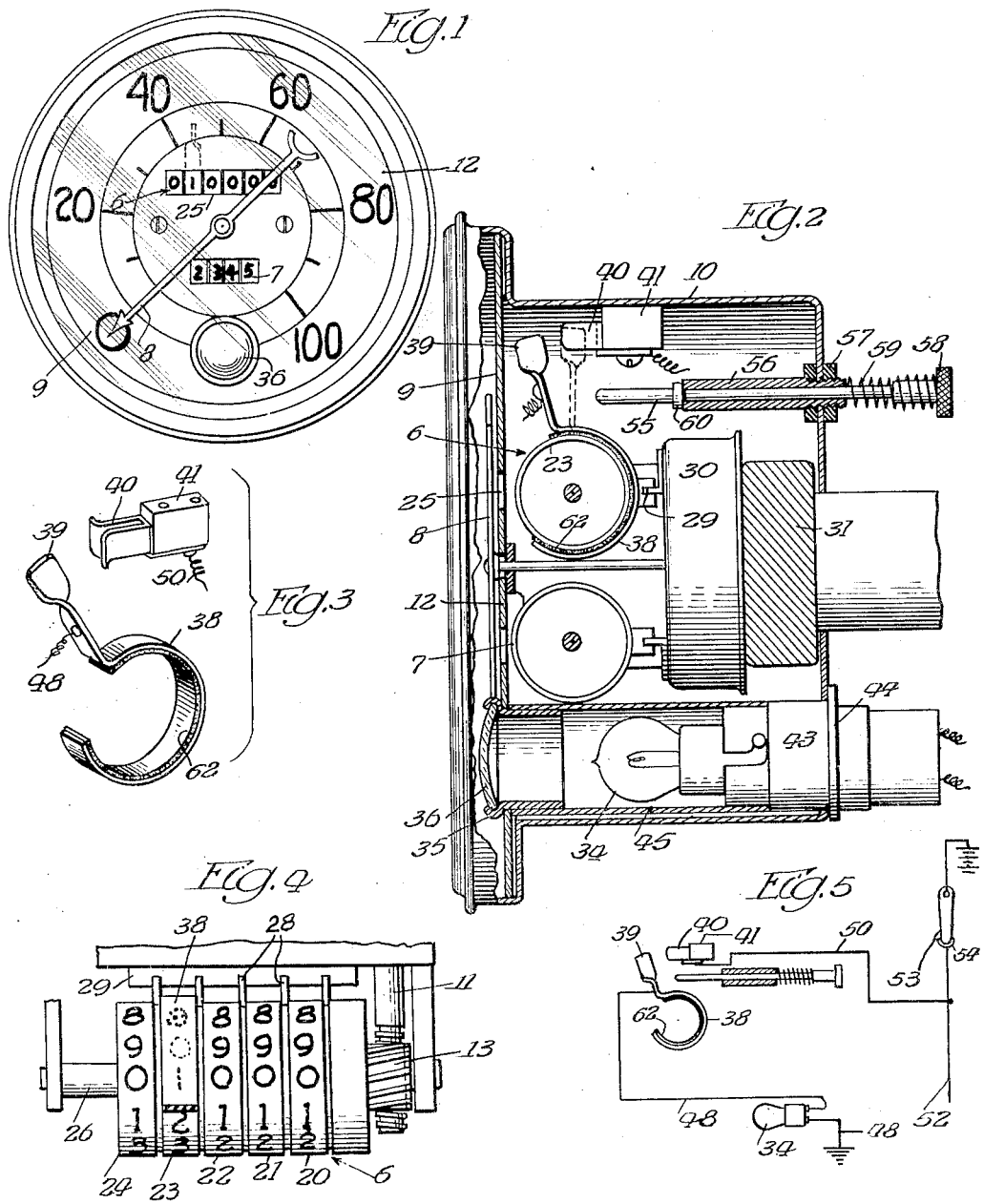
Inventor
William L. Willcox
By- Fred Gerlach
his Atty Patented Dec. 27, 1949

2,492,408

UNITED STATES PATENT OFFICE 2,492,408

SWITCH FOR SERVICE INDICATOR

William L. Willcox, Miami, Fla.

Application May 2, 1947, Serial No. 745,545

6 Claims. (Cl. 200—56)

The invention relates to indicator attachments for odometers used on motor vehicles.

In the operation of motor vehicles, it is desirable to provide an automatic, positive indication when it is necessary periodically to service the vehicle, for example, change of the oil in the crankcase or lubrication of the running parts, and to use the counter-mechanism of the odometer for controlling this indication.

One object of the invention is to provide an indicating device of this type which is controlled by an element which is mounted on and operable directly by, one of the counterwheels of the odometer, so that no change in the construction of the counter-mechanism is necessary. This object is attained primarily by providing a switch which includes a member which is carried and is frictionally operable by, one of the counterwheels which is operable step by step and which will close the switch and retain the switch closed until it is manually reset after the indicated service has been made.

Another object of the invention is to provide an indicator of this character which is simple in construction and may be inexpensively built into speedometers.

Other objects of the invention will appear from the detailed description.

The invention consists in the several novel features hereinafter set forth, and more particularly defined by claims at the conclusion hereof.

In the drawings:

Fig. 1 is a front elevation of a speedometer embodying the invention.

Fig. 2 is a vertical section of a speedometer embodying the invention, parts being shown in elevation.

Fig. 3 is a detail perspective of the members of the switch for controlling the indicating device.

Fig. 4 is a plan of the total mileage counter, the switch-member carried by one of the counterwheels, being shown in section.

Fig. 5 is a diagram of the electric indicator circuit.

The invention is exemplified in a device generally designated a "speedometer," which includes an odometer with a counter, generally designated 6 for the total miles traveled by the vehicle, a counter generally designated 7 for the miles traveled during a trip, and a device including a pointer 8 and a dial 9 for indicating the speed of travel of the vehicle. These devices are enclosed in a case 10. The speedometer is operated by mechanism well understood in the art. The odometer is driven from the speedometer drive shaft, through shaft 11 which is provided with a worm which meshes with a gear 13 which is connected to operate the counter 6, as well understood in the art. The trip counter is also operable from the shaft 11, as well understood in the art. These mechanisms are of usual construction and it has not been deemed necessary to illustrate their details.

The total mileage counter 6 includes a series of wheels, 20, 21, 22, 23 and 24, which bear numerals for indicating units, tens, hundreds, thousands and ten thousands of miles traveled, respectively. These wheels are carried by a shaft 26, and the numerals on said wheels are visible through a slot 25 in the dial 9. Each of these wheels, at the end of each complete revolution, through carrying devices well understood in the art, rotates the next wheel of the series one step, for progressively carrying the count through wheels 20, 21, 22, 23 and 24, to slot 25. Plates 28, which are disposed between said wheels and support said carrying devices, are held against rotation by an angle bar 29 which is secured to a case 30 which is supported on a frame 31. This exemplifies an odometer or counter which comprises a series of counting wheels which are progressively advanced one step for each revolution of the preceding wheel in the series.

The service indicator includes an electric lamp 34 which is actuated to produce a signal to the operator, and a switch which is automatically controlled by the odometer or counter-mechanism, for controlling the actuation of the lamp after the vehicle has traveled the predetermined distance which renders the service desirable or necessary. The signal given by the lamp, is usually desired at the end of each one thousand miles of travel and is controlled by an element which is applied to the counterwheel 23, so that the signal will be given when said wheel is rotatively advanced one step at the end of each one thousand miles of travel. Lamp 34 illuminates a colored lens or plate 36 which is mounted in a socket 35 which is mounted in the lower portion of dial 12.

The switch for controlling the actuation of lamp 34 to automatically produce the signal, comprises a resilient clip 38 formed of flat metal and extending around a sufficient portion of the periphery of wheel 23, so that it will be sustained by said wheel and will frictionally engage or grip the periphery of wheel 23, for unidirectional step-by-step movements therewith. This clip is provided with an integral extension which terminates in knifelike contact 39 which functions as a switch member and is adapted to pass between a U-shaped switch member 40, for closing the circuit through lamp 34. Switch member 40 is secured to a block 41 of insulating material which is secured to the top portion of the inner periphery of case 10. The clip 38 can be easily installed by flexing it into gripping relation with wheel 23. A characteristic of the clip is, that it is sustained by the intermittently rotatable wheel.

Lamp 34 is removably held in a lamp-socket 43, which is provided with a flange 44. A tube 45 extends between socket 43 and socket 35, for directing the rays from lamp 34 through lens 36. Socket 43 is removably held in case 10, to permit the socket and lamp to be removed through the back wall of case 10 when replacement of the lamp is necessary.

Switch member 39 is connected by a conductor 48 to one of the terminals in socket 43, and the other terminal in said socket is connected by a conductor 49, to ground. A conductor 52 from the coil of the ignition circuit, is connected by a conductor 50 to switch member 40 and to a contact 54 of switch 51 which controls the ignition circuit. The other contact 53 of said switch, is connected to battery. When ignition switch 51 is closed and the switch member 39 is shifted into engagement with the switch member 40, a circuit will be established from the ignition circuit via conductors 50, 52, switch member 40, switch member 39, conductor 48, and lamp 34, which will actuate lamp 34 and provide the signal indicating that the service is necessary. The purpose of connecting the controlled circuit for the lamp 34 to the ignition circuit, is to cause the indication of the lamp to be continued at all times during the operation of the engine, until the circuit for lamp 34 is interrupted, as hereinafter described. The inner periphery of clip 38 has a lining or coating of insulation 62 to exclude the odometer from the lamp-circuit.

The switch member 39 on clip 38 is adapted to be manually reset to open the circuit for lamp 34 after the desired service has been performed. For this purpose, a resetting device is provided which includes a stem 55 of insulating material, which is slidably mounted in a sleeve which is secured by nuts 57 to case 10. The ⸺ er end of stem 55 is adapted to abut against the clip 38 for disengaging the contact switch member 39 from member 40. A button 58 is fixed ⸺ secured to the outer end of stem 55. A spring 59 normally presses or urges the button 58 and stem 55 outwardly, so that a step 60 on stem 55 which engages the inner end of sleeve 56, will arrest the stem 55 and button 58 when it is released.

The operation of the indicating device will be as follows: Normally, clip 38 will be frictionally held on the periphery of and insulated from counterwheel 23 and supported by said wheel in position to separate switch member 39 from member 40, so that the circuit for lamp 34 will be interrupted. Wheel 23 will be advanced one step at the end of each one thousand miles of travel of the vehicle. Clip 38 which frictionally engages the periphery of wheel 23 and is supported by said wheel, will, during each advancing step of the wheel shift switch member 39 into engagement with switch member 40 and close the circuit for lamp 34, to produce the signal that the service is due. The intermittent movements of the counterwheel 23 occur while the vehicle is traveling and the engine is running, so that the circuit through the lamp will be maintained as long as the ignition circuit remains closed. When the engine is stopped, the ignition circuit will be interrupted and the circuit through lamp 34 will be open. As a result, the lamp 34 will be actuated at all times during the operation of the motor and until switch member 39 has been manually reset, which is done when the service has been performed. While the clip 38 has been illustrated as applied to the wheel 23, it will be obvious that the clip may be applied to any of the other counterwheels, depending upon the mileage for which an indication of service is desired.

The invention exemplifies an automatic indicator for use with counterwheels in which the switch for the actuation of the indicating device, is controlled by an element which frictionally and resiliently engages or grips and is operated and supported by, one of the intermittently movable counterwheels. The clip can be readily applied to the counterwheel and this avoids the necessity of any changes in the counting devices, for operating the switch. This construction can be inexpensively produced, easily installed in the speedometer case, and requires no change in the counter-mechanism. The connection of the control circuit to the ignition circuit, provides for the continued maintenance of the signal at all times while the engine is running, until the resetting device is operated.

The invention is not to be understood as limited to the details described, since these may be modified within the scope of the appended claims without departing from the spirit or scope of the invention.

Having thus described the invention, what I claim as new and desire to secure by Letters Patent is:

1. A circuit closer for a service indicator, comprising an intermittently advanced counterwheel provided with a periphery having numerals thereon, a switch element for a control circuit for the indicator, including means resiliently gripping the periphery of the wheel for rotation thereby and leaving exposed for visual indication at least one of the numerals on said wheel, and a switch contact engageable by said element for closing the circuit while said numeral remains exposed, and manually operable means for shifting said element to open the circuit.

2. A circuit closer for a service indicator, comprising an intermittently advanced counterwheel having a cylindrical numeral-bearing periphery, a switch element for a control circuit for the indicator extending partly around, resiliently gripping, and supported by, said wheel, leaving exposed for visual indication at least one of the numerals on said wheel, a switch-contact engaged by said element when the element is shifted by said counter-wheel, adapted to arrest said element for independent rotation of the wheel while said numeral remains exposed, and manually operable means for shifting the element to open the circuit.

3. A circuit closer for a service indicator, comprising an intermittently advanced counterwheel having a cylindrical numeral bearing periphery, a switch element for a control circuit for the indicator of conductive material extending partly around, frictionally gripping, insulated from, and supported by, said wheel, leaving exposed for visual indication at least one of the numerals on said wheel, and a contact on said element, a switch contact engageable by the contact on said element when the element is shifted by said counter-wheel, and adapted to arrest said element for independent rotation of the wheel, and manually operable means for shifting the element to open the circuit.

4. A circuit closer for a service indicator, comprising an intermittently advanced counter-wheel having a cylindrical numeral bearing periphery, a switch element for a control circuit for the indicator including a clip extending partly around, resiliently gripping, and supported by, said wheel, leaving exposed for visual indication at least one of the numerals on said wheel, and a contact on said element, a switch contact engageable by the contact on said element when the element is shifted by said counter-wheel, and adapted to arrest said element for independent rotation of the wheel, and manually operable means for shifting the element to open the circuit.

5. A circuit closer for a service indicator, comprising an intermittently advanced counter-wheel having a cylindrical numeral bearing periphery, a switch element for a control circuit on the indicator including a clip extending partly around, resiliently gripping, and supported by, said wheel, leaving exposed for visual indication at least one of the numerals on said wheel, an arm on the clip and a switch contact on said arm, a second switch contact engageable by the contact on the arm when the element is shifted by said counter-wheel and adapted to arrest said element for independent rotation of the wheel, and manually operable means for shifting the element to open the circuit.

6. A circuit closer for a service indicator, comprising a counter-wheel which is intermittently advanced step by step and having a cylindrical numeral-bearing periphery, a switch element for a control circuit including a strip forming a clip resiliently gripping the periphery of said wheel for rotation by said wheel, leaving exposed for visual indication at least one of the numerals on said wheel and extended to form an arm, a switch contact engageable by said arm when it is shifted by said counter-wheel, and adapted to arrest said arm, and means for shifting said arm to open the circuit.

WILLIAM L. WILLCOX.

REFERENCES CITED

The following references are of record in the file of this patent:

UNITED STATES PATENTS

| Number | Name | Date |
|---|---|---|
| 564,168 | Tower | July 14, 1896 |
| 1,195,494 | Nichols | Aug. 22, 1916 |
| 2,130,290 | Polta | Sept. 13, 1938 |

FOREIGN PATENTS

| Number | Country | Date |
|---|---|---|
| 523,983 | Germany | Apr. 30, 1931 |
| 879,088 | France | Nov. 10, 1942 |